(12) United States Patent
Tussing et al.

(10) Patent No.: US 7,637,234 B2
(45) Date of Patent: Dec. 29, 2009

(54) SPLIT-CYCLE ENGINE WITH A HELICAL CROSSOVER PASSAGE

(75) Inventors: Mark Tussing, San Antonio, TX (US); Wei Li, San Antonio, TX (US); Gareth Roberts, New Haven (GB)

(73) Assignee: Scuderi Group, LLC, West Springfield, MA (US)

( * ) Notice: Subject to any disclaimer, the term of this patent is extended or adjusted under 35 U.S.C. 154(b) by 0 days.

(21) Appl. No.: 12/157,555

(22) Filed: Jun. 11, 2008

(65) Prior Publication Data
US 2009/0038599 A1    Feb. 12, 2009

Related U.S. Application Data

(60) Provisional application No. 60/963,742, filed on Aug. 7, 2007.

(51) Int. Cl.
*F02B 33/00* (2006.01)
*F02B 31/00* (2006.01)

(52) U.S. Cl. .................................. 123/70 R; 123/306
(58) Field of Classification Search .............. 123/68, 123/70 R, 70 V, 72, 306–310, 71 R
See application file for complete search history.

(56) References Cited

U.S. PATENT DOCUMENTS

| | | | | |
|---|---|---|---|---|
| 3,861,375 A | * | 1/1975 | Excoffon | 123/188.14 |
| 4,703,729 A | * | 11/1987 | Sakano et al. | 123/308 |
| 4,744,342 A | | 5/1988 | Ochiai | |
| 4,945,873 A | * | 8/1990 | Kirchweger et al. | 123/308 |
| 5,855,194 A | * | 1/1999 | Okumura et al. | 123/308 |
| 6,952,923 B2 | * | 10/2005 | Branyon et al. | 123/70 R |
| 7,444,230 B2 | | 10/2008 | Cheiky | |
| 7,546,826 B2 | | 6/2009 | Cheiky | |
| 2007/0227494 A1 | | 10/2007 | Cheiky | |
| 2009/0088952 A1 | | 4/2009 | Cheiky | |

* cited by examiner

*Primary Examiner*—Noah Kamen
(74) *Attorney, Agent, or Firm*—Fildes & Outland, P.C.

(57) ABSTRACT

An engine has a crankshaft. A compression piston within a compression cylinder is connected to the crankshaft such that the compression piston reciprocates through an intake stroke and a compression stroke. An expansion piston within an expansion cylinder is connected to the crankshaft such that the expansion piston reciprocates through an expansion stroke and an exhaust stroke. A crossover passage interconnects the compression and expansion cylinders. The crossover passage includes a crossover compression valve and a crossover expansion valve. A runner section is in a downstream portion of the crossover passage, and a helical end section is integrally connected to the runner section. The helical end section has a funnel spiraling about a valve stem of the crossover expansion valve. The funnel forces incoming air to rotate about the valve stem prior to entering the expansion cylinder to promote turbulent kinetic energy in the cylinder air/fuel charge.

15 Claims, 7 Drawing Sheets

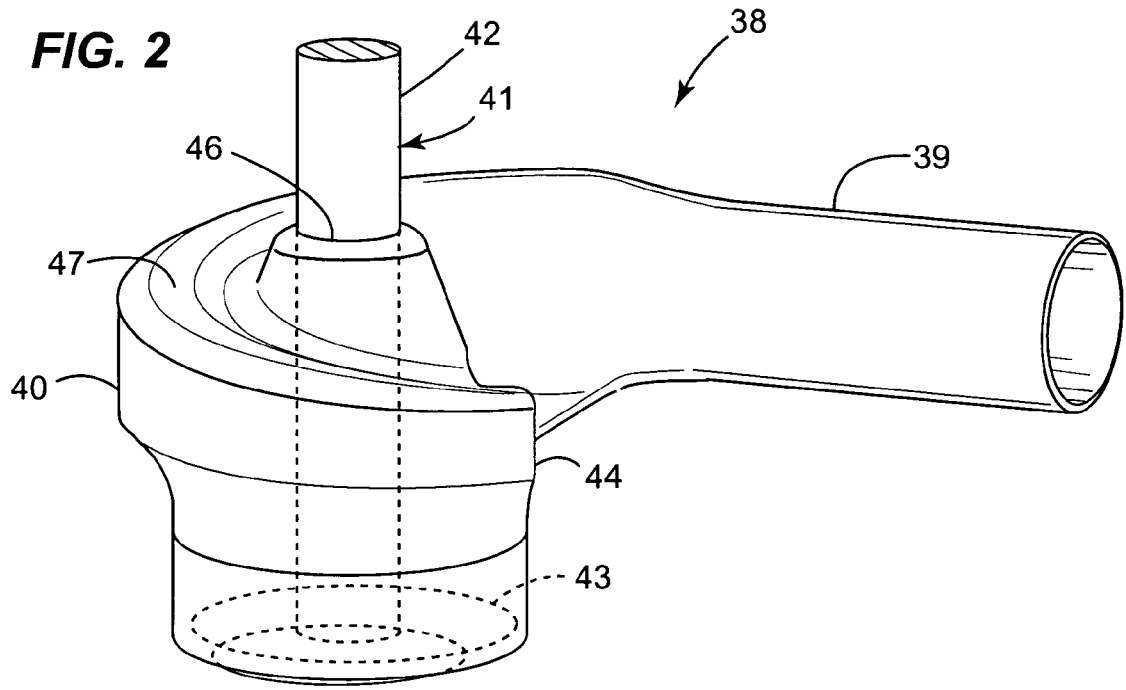
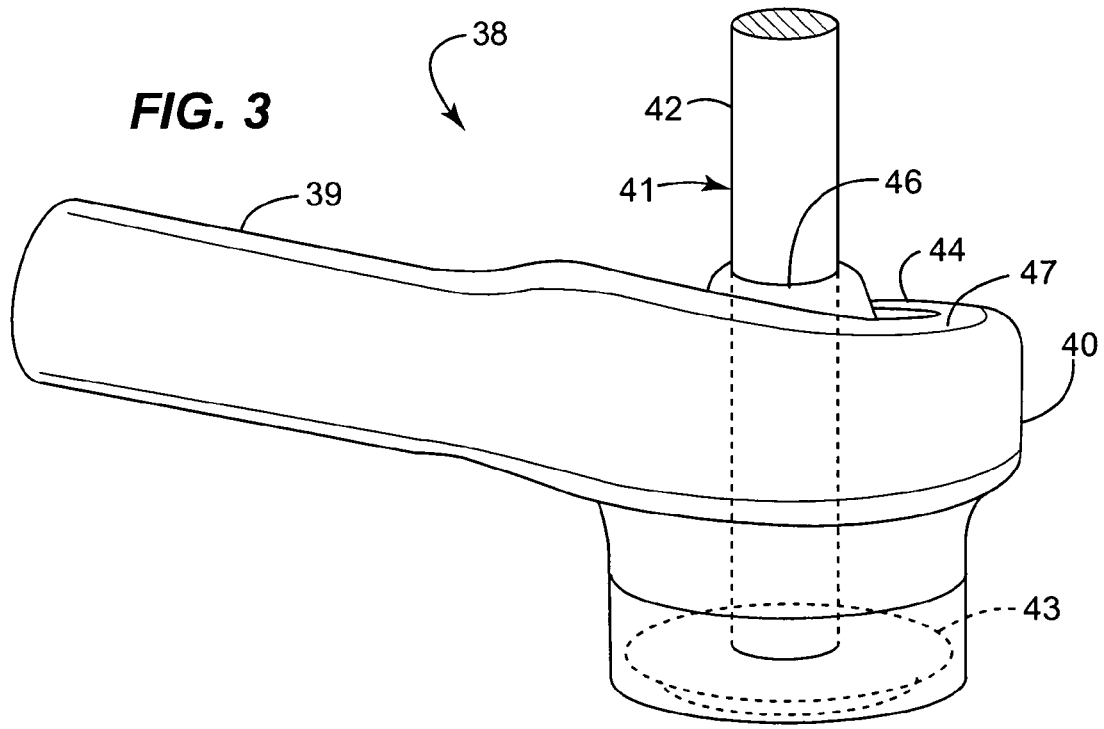

US 7,637,234 B2

SPLIT-CYCLE ENGINE WITH A HELICAL CROSSOVER PASSAGE

CROSS REFERENCE TO RELATED APPLICATIONS

This application claims the benefit of U.S. Provisional Patent Application No. 60/963,742 filed Aug. 7, 2007.

TECHNICAL FIELD

The present invention relates to internal combustion engines. More specifically, the present invention relates to a split-cycle engine having a compression cylinder and an expansion cylinder interconnected by dual tangential helical crossover passages.

BACKGROUND OF THE INVENTION

For purposes of clarity, the term "conventional engine" as used in the present application refers to an internal combustion engine wherein all four strokes of the well known Otto cycle (i.e., the intake, compression, expansion and exhaust strokes) are contained in each piston/cylinder combination of the engine. Also, for purposes of clarity, the following definition is offered for the term "split-cycle engine" as may be applied to engines disclosed in the prior art and as referred to in the present application.

A split-cycle engine as referred to herein comprises:

a crankshaft rotatable about a crankshaft axis;

a compression piston slidably received within a compression cylinder and operatively connected to the crankshaft such that the compression piston reciprocates through an intake stroke and a compression stroke during a single rotation of the crankshaft;

an expansion (power) piston slidably received within an expansion cylinder and operatively connected to the crankshaft such that the expansion piston reciprocates through an expansion stroke and an exhaust stroke during a single rotation of the crankshaft; and a crossover passage (port) interconnecting the compression and expansion cylinders, the crossover passage including a crossover compression (XovrC) valve and a crossover expansion (XovrE) valve defining a pressure chamber therebetween.

U.S. Pat. No. 6,543,225 granted Apr. 8, 2003 to Carmelo J. Scuderi contains an extensive discussion of split-cycle and similar type engines. In addition the patent discloses details of a prior version of an engine of which the present invention comprises a further development.

Referring to FIG. 1, an exemplary embodiment of a prior art split-cycle engine concept of the type described in U.S. Pat. No. 6,543,225 is shown generally by numeral 10. The split-cycle engine 10 replaces two adjacent cylinders of a conventional four-stroke engine with a combination of one compression cylinder 12 and one expansion cylinder 14. These two cylinders 12, 14 perform their respective functions once per crankshaft 16 revolution. The intake air and fuel charge is drawn into the compression cylinder 12 through typical poppet-style intake valves 18. The compression piston 20 pressurizes the charge and drives the charge through the crossover passage 22, which acts as the intake passage for the expansion cylinder 14.

A check type crossover compression (XovrC) valve 24 at the crossover passage inlet is used to prevent reverse flow from the crossover passage 22. A crossover expansion (XovrE) valve 26 at the outlet of the crossover passage 22 controls flow of the pressurized intake charge such that the charge fully enters the expansion cylinder 14 shortly after expansion piston 30 reaches its top dead center position. Spark plug 28 is fired soon after the intake charge enters the expansion cylinder 14 and the resulting combustion drives the expansion piston 30 down. Exhaust gases are pumped out of the expansion cylinder through poppet exhaust valves 32.

With the split-cycle engine concept, the geometric engine parameters (i.e., bore, stroke, connecting rod length, compression ratio, etc.) of the compression and expansion cylinders are generally independent from one another. For example, the crank throws 34, 36 for each cylinder may have different radii and be phased apart from one another with top dead center (TDC) of the expansion piston 30 occurring prior to TDC of the compression piston 20. This independence enables the split-cycle engine to potentially achieve higher efficiency levels and greater torques than typical four stroke engines.

One of the differences of the split-cycle engine 10, in comparison to a conventional internal combustion engine, is that its charge motion must commence after the expansion piston 30 reaches TDC during the expansion stroke in the expansion cylinder 14, whereas charge motion in a conventional engine begins approximately 360 crank angle (CA) degrees before top dead center (BTDC) of the expansion stroke (i.e. at the beginning of the intake stroke). This allows the conventional engine more time, relative to a split-cycle engine, to develop a suitable charge motion to assist fuel/air mixing and combustion.

Charge motion is necessary for satisfactory spark ignition (SI) combustion. Accordingly, there is a need to rapidly generate charge motion in a split-cycle engine in order to rapidly mix and adequately distribute a fuel/air charge prior to the start of combustion, which occurs approximately 15-20° CA after top dead center (ATDC). Additionally, appropriate fuel/air movement must occur during the main phase of burning, which is approximately 20-40° CA ATDC, depending on operating conditions.

SUMMARY OF THE INVENTION

A split-cycle engine according to the invention may include a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft; and a helical crossover passage interconnecting the compression and expansion cylinders, the helical crossover passage including:

a crossover compression valve and a crossover expansion valve defining a pressure chamber therebetween, a generally straight runner section in a downstream portion of the helical crossover passage, and a helical end section integrally connected to the runner section and disposed over the crossover expansion valve, the crossover expansion valve having a valve stem and head, the helical end section enclosing a funnel spiraling about the valve stem, wherein the funnel forces incoming air to rotate about the valve stem prior to entering the expansion cylinder to promote development of turbulent kinetic energy and swirl in the air/fuel charge delivered to the expansion cylinder.

Additional features may include:

orientation of the straight runner sections in tangent or radial positions relative to the expansion cylinder periphery;

orientation of the crossover passage end sections in clockwise, counterclockwise and directed positions.

These and other features and advantages of the invention will be more fully understood from the following description of certain exemplary embodiments taken together with the accompanying drawings.

BRIEF DESCRIPTION OF THE DRAWINGS

FIG. 2 is a pictorial view of the straight runner and helical end sections of a downstream portion of a helical passage disposed over a poppet valve, viewed from the helical end side;

FIG. 3 is a view similar to FIG. 2 but from the straight runner side;

DETAILED DESCRIPTION OF THE INVENTION

Glossary

Figure 1:
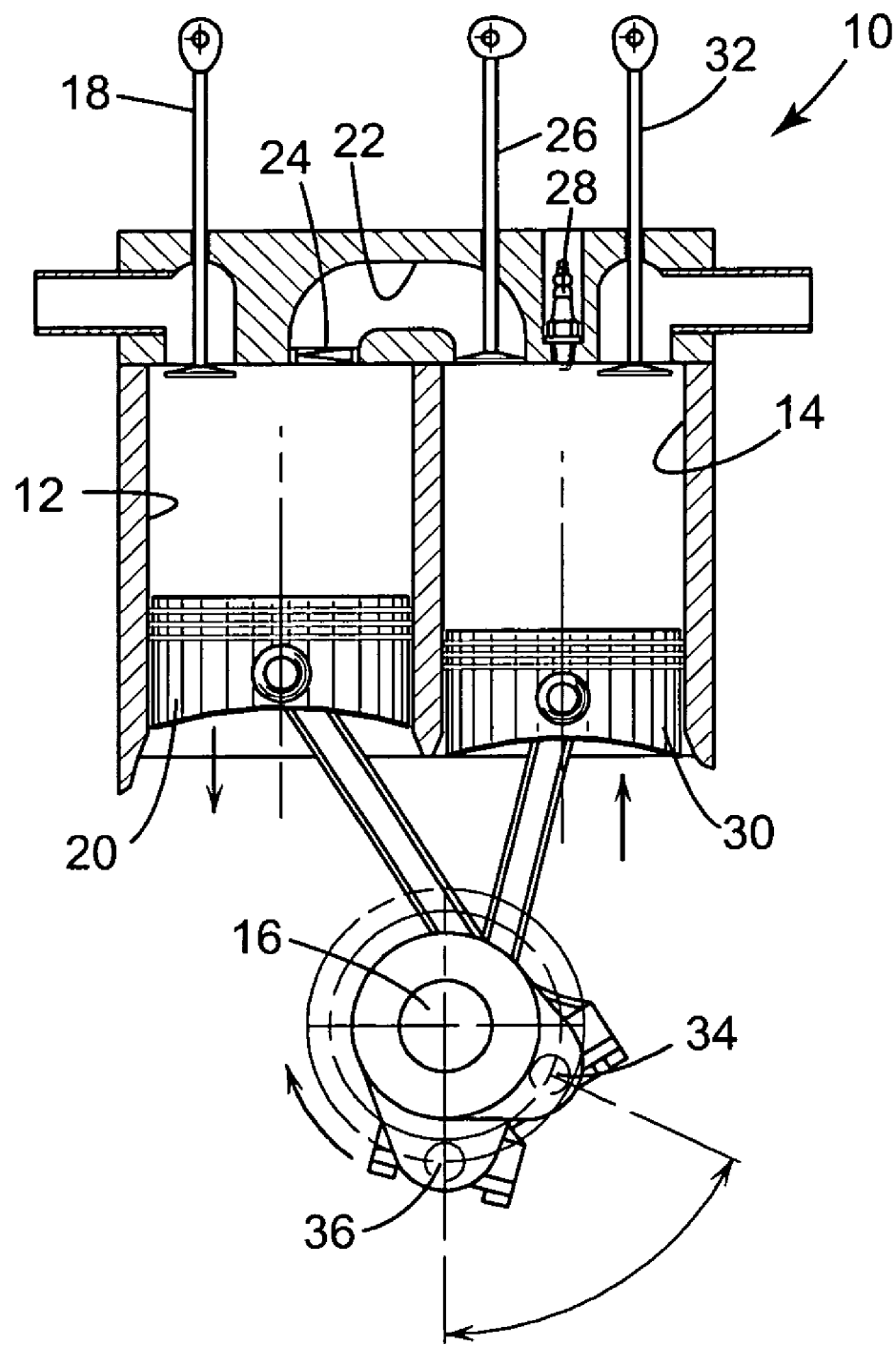
FIG. 1 is a transverse cross-sectional view of a prior art split-cycle engine related to the engine of the invention.

The following glossary of acronyms and definition of terms used herein is provided for reference:

Helical passage (or Helical port): Referring to FIGS. 2 and 3, a helical passage 38 is a connecting passage (port), which typically links an inlet manifold to an inlet valve in a cylinder head of a conventional engine. The downstream portion of the helical passage 38 includes a generally straight runner section 39 integrally connected to a helical end section 40, which is disposed over an inlet valve 41 having a stem 42 and a head 43 opening to a cylinder (not shown). The flow area within the helical end section 40 is disposed in a circumferential and descending funnel 44 around the valve stem 42 carried in a bore 46 of the end section 40. The funnel spirals over at least one third of a turn, and preferably between one half and three quarters of a turn, about the valve stem 42, so that incoming air is forced to rotate about the valve stem 42 prior to entering the cylinder. The roof 47 of the funnel 44 reduces in height as the funnel 44 spirals around the valve stem 42.

Swirl: The organized rotation of the (air) charge about the cylinder axis. More specifically, "bulk" swirl of air or fuel/air mixture in a cylinder of an engine is the rotation of the main body, i.e. "bulk", of the air or fuel/air mixture, about the cylinder centerline, measured over an induction (or intake) stroke. The bulk swirl is a parameter concept or averaging of the true variable air motion that occurs in a cylinder during induction. According to the bulk swirl concept, the swirl is a vortex centered about the major cylinder axis, with the maximum swirl speed at the cylinder periphery.

Swirl Ratio (SR): The conceptual rotational frequency metric of the main body, i.e. "bulk", of the air or fuel/air mixture, about the cylinder centerline, measured over an induction (or intake) stroke and referenced to the rotational speed of the engine, i.e.:

Swirl ratio=Air rotational frequency in cylinder/engine speed

Turbulence and micro turbulence: Small scale eddy motions, usually associated with very small individual portions of the air. The frequency of turbulence and micro turbulence eddies spans 10-10,000 Hz and greater, while the diameter of the micro turbulence will vary inversely with frequency from a small part of the cylinder (several millimeters) to microns. The high frequency turbulence usually only persists for very short periods, e.g. 2-5 degrees crank angle, due to viscous dissipation.

Turbulent Kinetic Energy (TKE): The mean kinetic energy per unit of air mass associated with eddies in turbulent air flow of an engine.

Description

Figure 4:
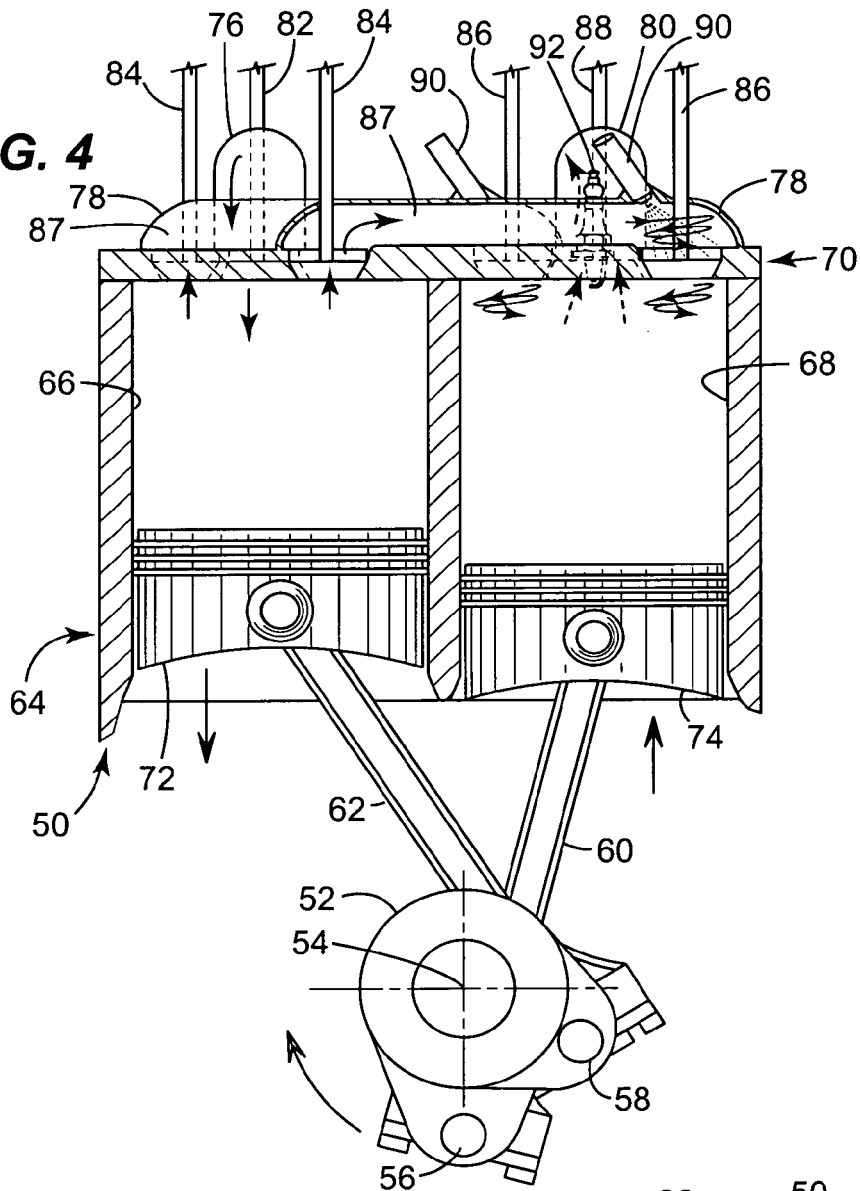
FIG. 4 is a transverse cross-sectional view from line 4-4 of FIG. 5 of an exemplary split-cycle engine with helical crossover passages according to the present invention.
Figure 5:
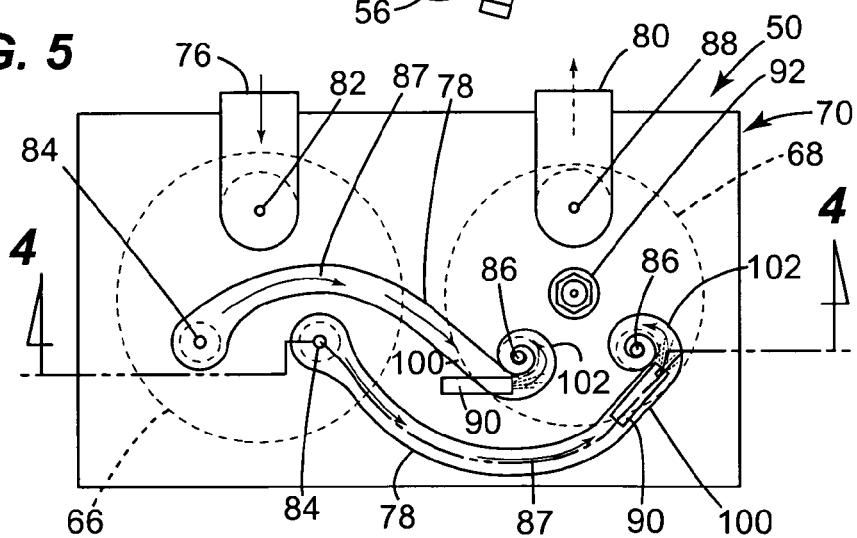
FIG. 5 is a top view of the split-cycle engine of FIG. 4.

Referring to FIGS. 4 and 5 of the drawings in detail, numeral 50 generally indicates an exemplary embodiment of a split-cycle engine having dual tangential helical crossover passages 78 in accordance with the present invention. As will be discussed in greater detail herein, the downstream portions of the helical crossover passages 78 include tangential runner sections 100 integrally connected to helical end sections 102 which advantageously promote rapid fuel/air mixing during the expansion stroke of the split-cycle engine 50.

Engine 50 includes a crankshaft 52 rotatable about a crankshaft axis 54 in a clockwise direction as shown in the drawing. The crankshaft 52 includes adjacent angularly displaced leading and following crank throws 56, 58, connected to connecting rods 60, 62, respectively.

Engine 50 further includes a cylinder block 64 defining a pair of adjacent cylinders. In particular, engine 50 includes a compression cylinder 66 and an expansion cylinder 68 closed by a cylinder head 70 at an upper end of the cylinders opposite the crankshaft 52.

A compression piston 72 is received in compression cylinder 66 and is connected to the following connecting rod 62 for reciprocation of the piston 72 between top dead center (TDC) and bottom dead center (BDC) positions. An expansion piston 74 is received in expansion cylinder 68 and is connected to the leading connecting rod 60 for similar TDC/BDC reciprocation.

The cylinder head 70 provides the structure for gas flow into, out of and between the cylinders 66, 68. In the order of gas flow, the cylinder head 70 includes an intake passage 76 through which intake air is drawn into the compression cylinder 66, a pair of tangential helical crossover (Xovr) passages 78 through which compressed air is transferred from the compression cylinder 66 to the expansion cylinder 68, and an exhaust passage 80 through which spent gases are discharged from the expansion cylinder 68.

Gas flow into the compression cylinder 66 is controlled by an inwardly opening poppet type intake valve 82. Gas flow into and out of each helical crossover passage 78 may be controlled by a pair of outwardly opening poppet valves, i.e., crossover compression (XovrC) valves 84 at inlet ends of the helical crossover passages and crossover expansion (XovrE) valves 86 at outlet ends of the helical crossover passages. Each pair of crossover valves 84, 86 defines a pressure chamber 87 between them in their respective crossover passages. Exhaust gas flow out the exhaust passage 80 is controlled by an inwardly opening poppet type exhaust valve 88. These valves 82, 84, 86 and 88 may be actuated in any suitable manner, such as by mechanically driven cams, variable valve actuation technology, or the like.

Each helical crossover passage 78 has at least one high pressure fuel injector 90 disposed therein. The fuel injectors 90 are operative to inject fuel into the charge of compressed air within the pressure chambers 87 of the helical crossover passages 78.

Engine 50 also includes one or more spark plugs 92 or other ignition devices. The spark plugs 90 are located at appropriate locations in the end of the expansion cylinder 68 wherein a mixed fuel and air charge may be ignited and burn during the expansion stroke.

Figure 6:
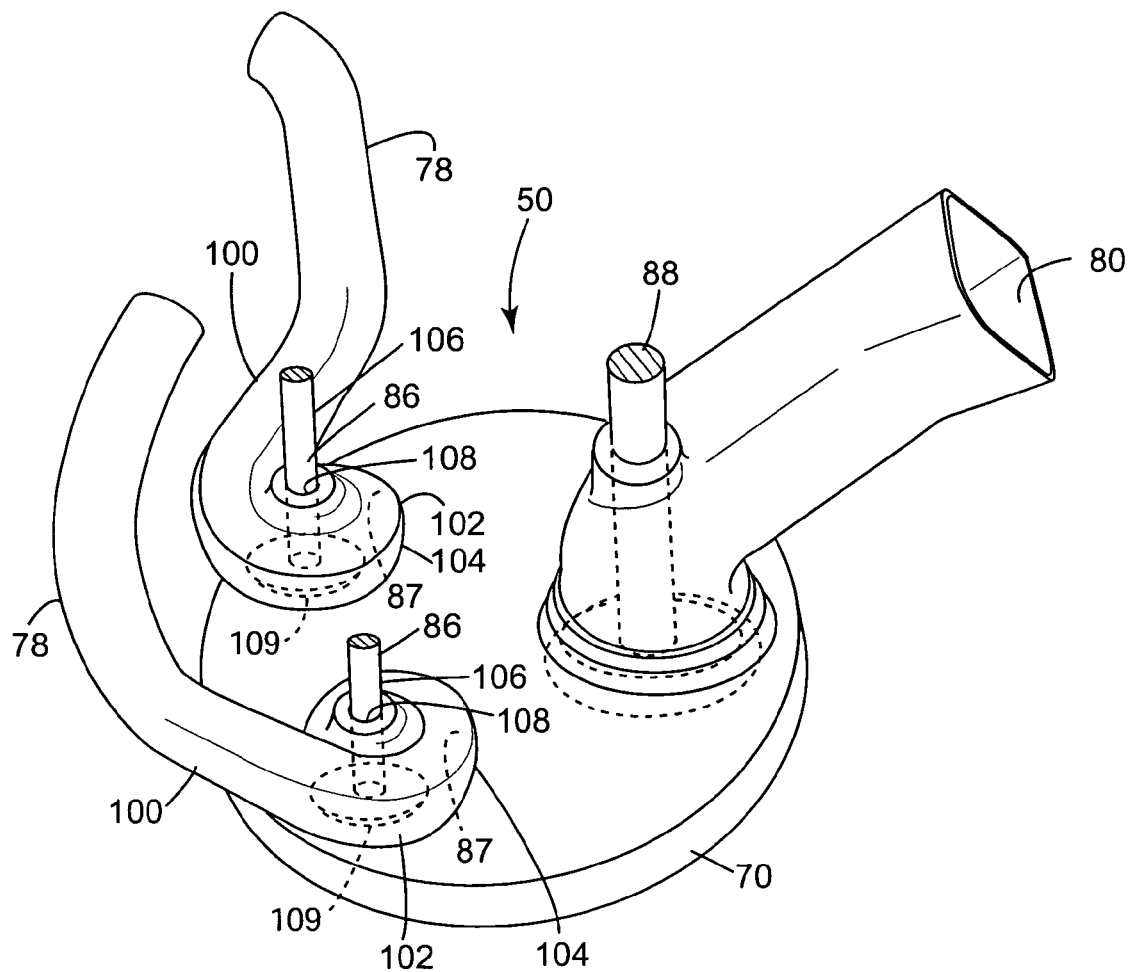
FIG. 6 is a pictorial view of the expansion cylinder head internal face with internal exhaust port and crossover passage downstream portions and valves.

Referring to FIG. 6, a close up view is shown of the inside of the cylinder head 70 and passages including the exhaust passage 80 and downstream portions of the dual tangential helical crossover passages 78. As previously discussed, a fuel/air charge must flow from the crossover passages 78 into the expansion cylinder 68 where it is combusted during the expansion stroke and ultimately discharged through the exhaust passage 80 during the exhaust stroke. Prior to combustion, the fuel/air charge must be rapidly mixed and thoroughly distributed in the expansion cylinder 68.

Both crossover passages 78 are constructed with a generally straight tangential runner section 100 integrally connected to a counterclockwise helical end section 102, which is disposed over the outwardly opening poppet type crossover expansion valve 86. Optionally, each runner section 100 can be oriented tangentially or radially relative to the expansion cylinder 68, such orientation determining the bulk flow direction of the fuel/air charge as it enters the cylinder 68. Also, optionally, each helical end section 102 may spiral in a clockwise or counterclockwise direction, such rotational direction determining the direction of rotation or spin (if any) the fuel/air charge will have as it enters the cylinder 68.

Alternatively, if the end section of the crossover passage 78 does not include a helical spiral, the crossover passage is known as a directed crossover passage (or directed crossover port) which can determine the bulk flow or swirl, but the fuel/air charge has no specific rotational spin as it enters the expansion cylinder 68.

In the embodiment of FIG. 6, each counterclockwise helical end section 102 includes a funnel 104 spiraling in a counterclockwise direction about a valve stem 106 carried in a bore 108, through which the valve stem of each outwardly opening crossover expansion valve 86 extends. The spiral funnel 104 forces incoming air to rotate about the valve stem 106 prior to entering the expansion cylinder 68. The valve stem carries an outwardly opening valve head 109, which is held closed, partially by pressure in the pressure chamber 87, when the valve is seated.

Each runner section 100 is tangential to the perimeter of the expansion cylinder 68. That is, each runner section 100 directs air flow into the funnel 104 in a flow path that is approximately parallel (i.e., preferably plus or minus 20 degrees, more preferably plus or minus 10 degrees and most preferably plus or minus 5 degrees) to a tangential line extending through a point in the expansion cylinder's 68 perimeter which is closest to the valve stem. The valve stem 106 carries an outwardly opening valve head 109 which is held closed, partially by pressure in the pressure chamber 87, when the valve is seated. This combination of dual tangential helical crossover passages 78 in which both helical end sections 102 spiral in the same direction has been found to greatly promote rapid air/fuel mixing in the split-cycle engine 50.

Figure 7:
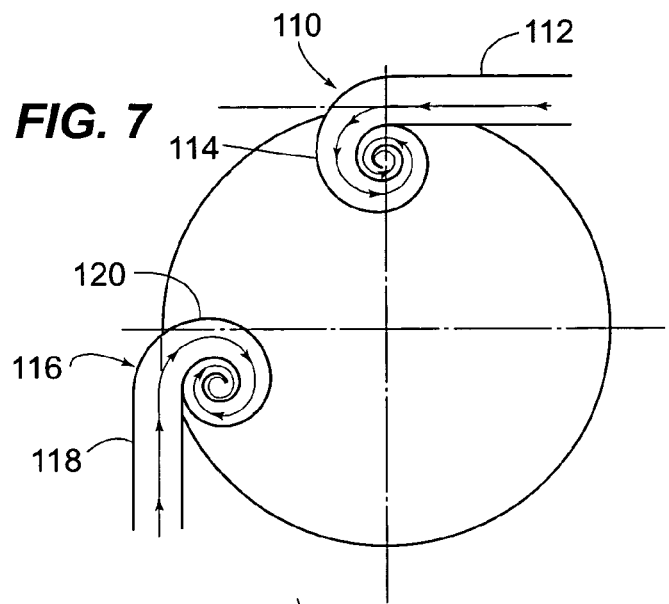
FIGS. 7-9 are top views of exemplary crossover passage downstream portions at the expansion cylinder including tangent and radial straight runner sections with clockwise and counterclockwise helical and direct end sections.
Figure 8:
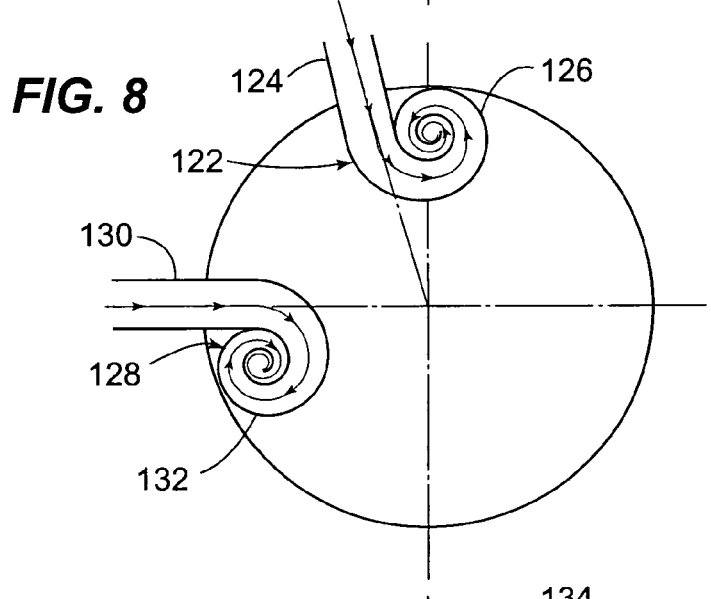
Figure 9:
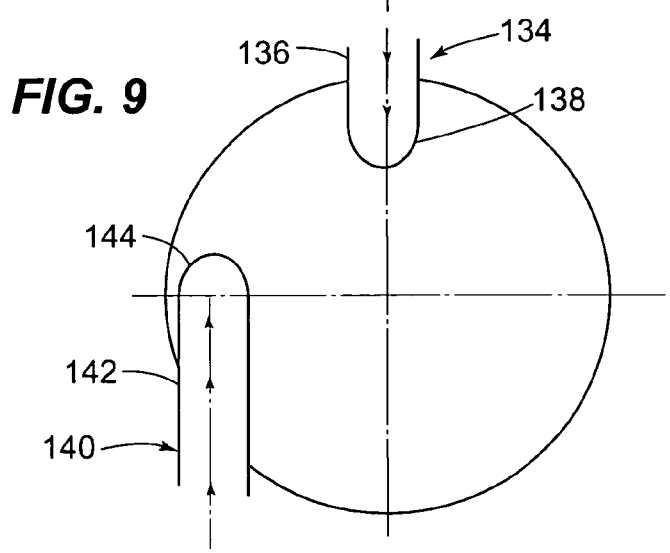

Referring to FIGS. 7-9, the six possible combinations of tangential or radial runner sections, plus counterclockwise helical, clockwise helical or directed end sections are illustrated. In FIG. 7, crossover passage 110 includes a tangential (tan) runner section 112 with a counterclockwise (ccw) helical section 114 as previously illustrated in FIG. 6, and crossover passage 116 includes a tangential runner section 118 with a clockwise (cw) helical section 120.

In FIG. 8, crossover passage 122 includes a radial (rad) runner section 124 with a counterclockwise helical section 126, and crossover passage 128 includes a radial runner section 130 with a clockwise helical section 132. The radial runner sections 124 and 130 direct air flow into the funnels of helical sections 126 and 132, respectively, in a flow path that is approximately radial (i.e., preferably plus or minus 20 degrees, more preferably plus or minus 10 degrees and most preferably plus or minus 5 degrees) to the center of the expansion cylinder 68.

In FIG. 9, crossover passage 134 includes a radial runner section 136 with a directed (dir) end section 138, and crossover passage 140 includes a tangential runner section 142 with a directed end section 144. The directed end sections 138 and 144 do not impart any specific rotational spin to the fuel/air charge as it enters the expansion cylinder 68. However, the bulk flow path of the charge is still determined by the orientation of the runners 136 and 142, i.e., toward the expansion cylinder's 68 center for radial runner 136 and tangentially along the cylinder's 68 perimeter for tangential runner 142.

In a conventional engine, the accepted method for achieving the appropriate air movement for combustion depends largely on two separate phenomena known as swirl and turbulence. Swirl is the generation of a bulk air rotational movement in the cylinder, such as a large rotating vortex, with an outer diameter bounded by the cylinder bore diameter, so that there is considerable kinetic energy in the air. This bulk swirl motion is transformed into turbulence during the later stages of compression. More specifically, the swirl motion is transformed to very small scale "micro-turbulence", i.e. a multitude of miniscale vortices on the order of $1/100,000$ to $1/100$ of the cylinder diameter. These micro-turbulence vortices are ideally in the zone of burning at the appropriate moment so that they can wrinkle the flame front to create a larger area for the flame to spread, i.e. to access unburned fuel and air.

In conventional engines, the inlet ports (or passages) are responsible for generation of the bulk swirl during the intake stroke, while the approach of the piston crown to the cylinder head around TDC is responsible for the transformation of swirl into turbulence. Inlet passages are therefore developed for their ability to develop swirl, rated in terms of "swirl ratio" (SR), which relates the speed of the vortex to the engine speed. Swirl ratio can be measured using a specialized flow rig or, more recently, can be calculated using computational fluid dynamics (CFD) techniques. Using CFD, it is also possible to model the subsequent conversion of swirl into turbulence, which is heavily influenced by the shape of combustion chamber features in the head and/or piston. One of the parameters used to assess the level of turbulence is Turbulent Kinetic Energy (TKE), which is a measure of the total momentum of all of the vortices, large and small.

For conventional engines, the development of these two processes is treated largely separately, as they occur at different times in the engine operating cycle, i.e., swirl during the intake stroke and turbulence during the compression stroke. However, in the split-cycle engine 50, because the inflow of air from the crossover passages 78 to the expansion cylinder 68 occurs so close to TDC, the crossover passages themselves must be responsible for both swirl and turbulence generation.

Passage arrangements which are suitable for the generation of swirl are reasonably well established for conventional engines; however, it was previously not known whether these same arrangements would also be effective in the split-cycle engine 50. Additionally, the degree of uncertainty of the effect of passage arrangements on swirl in split-cycle engine 50 was compounded because engine 50 includes outwardly opening poppet XovrE valves 86 which open away from the expansion cylinder 68, whereas conventional engines almost universally utilize inwardly opening poppet valves which open into a conventional expansion cylinder. Furthermore, it was not previously known how swirl generation was related to TKE.

Moreover, the effect of each of the six configurations of crossover passage 78 illustrated in FIGS. 7-9 on swirl and turbulence in the split-cycle engine 50 was not previously known. Additionally, since there are two individual crossover passages 78, there are a total of at least 36 possible combined crossover passage configurations for each expansion cylinder 68, and it was also not known how each dual crossover passage configuration would affect swirl and turbulence.

Figure 10:
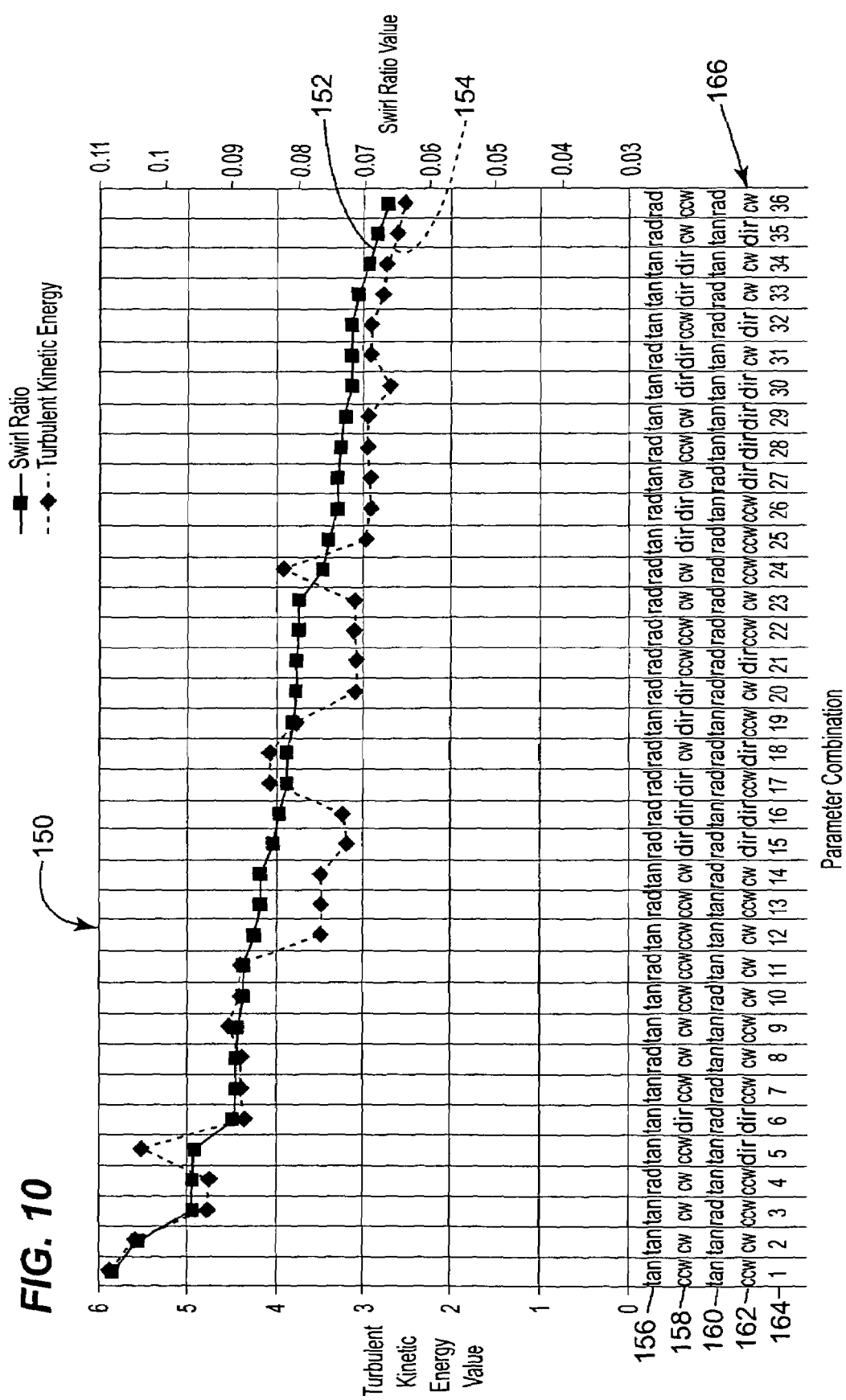
FIG. 10 is a graph and explanatory grid indicating swirl ratio and turbulent kinetic energy predicted values for 36 dual crossover passage combinations.

Referring to FIG. 10, accordingly, an exhaustive predictive CFD study was performed in which the 36 crossover passage configurations were compared for optimum charge motion for the split-cycle engine 50. Graph 150 shows the results of that study. Data grid 166, which extends horizontally at the bottom of the graph 150 and is arranged in 36 columns and 5 rows, represents the 36 possible parameter combinations for the dual crossover passages 78. The relative turbulent kinetic energy values run vertically along the left hand side of the graph 150, while the relative swirl ratio values run vertically along the right hand side of the graph 150.

Within grid 166, row 156 represents the tangent (tan) or radial (rad) orientation of the runner section 100 of the first of the two crossover passages 78, and row 158 represents the clockwise (cw) helical, counterclockwise (ccw) helical or directed (dir) configuration of the end section 102 of the first of the two crossover passages 78. Also within grid 166, row 160 represents the tangent (tan) or radial (rad) orientation of the runner section 100 of the second of the two crossover passages 78, and row 162 represents the clockwise (cw) helical, counterclockwise (ccw) helical or directed (dir) configuration of the end section 102 of the second of the two crossover passages 78. Row 164 numbers the various parameter combinations from 1-36 for ease of reference. The effect of each of the 36 combinations on swirl ratio and turbulent kinetic energy is plotted in lines 152 and 154 respectively.

A general trend was observed that the higher swirl producing passages also produced higher levels of TKE. The dual tangential helical passages having end section rotations in the same direction, i.e., parameter combinations 1 and 2 in row 164, produced both the highest level of bulk swirl and turbulent kinetic energy.

The predictive work showed that an effective means of generating in-cylinder charge motion for the expansion cylinder 68 of split-cycle engine 50 is to use two tangential helical crossover passages 78 (best seen in FIG. 6), arranged with the tangential runner sections 100 discharging tangentially relative to the expansion cylinder 68 perimeter and the two helical end sections 102 rotating in the same direction (either clockwise or counterclockwise). Accordingly, the direction of the rotation of the air leaving each passage is in the same direction. In this way, the kinetic energy of the air emerging from each passage is additive, thus providing the highest in cylinder bulk motion and at the same time generating a high level of TKE.

While FIGS. 4-6 are described as illustrating an exemplary embodiment of the invention, and FIGS. 7-10 are included to show the extensive studies undertaken to determine which of various port arrangements considered were predicted to provide the highest swirl ratio and turbulent kinetic energy values, it is recognized that other alternative crossover passage arrangements could be utilized having features included within the intended scope of the present invention.

Figure 11:
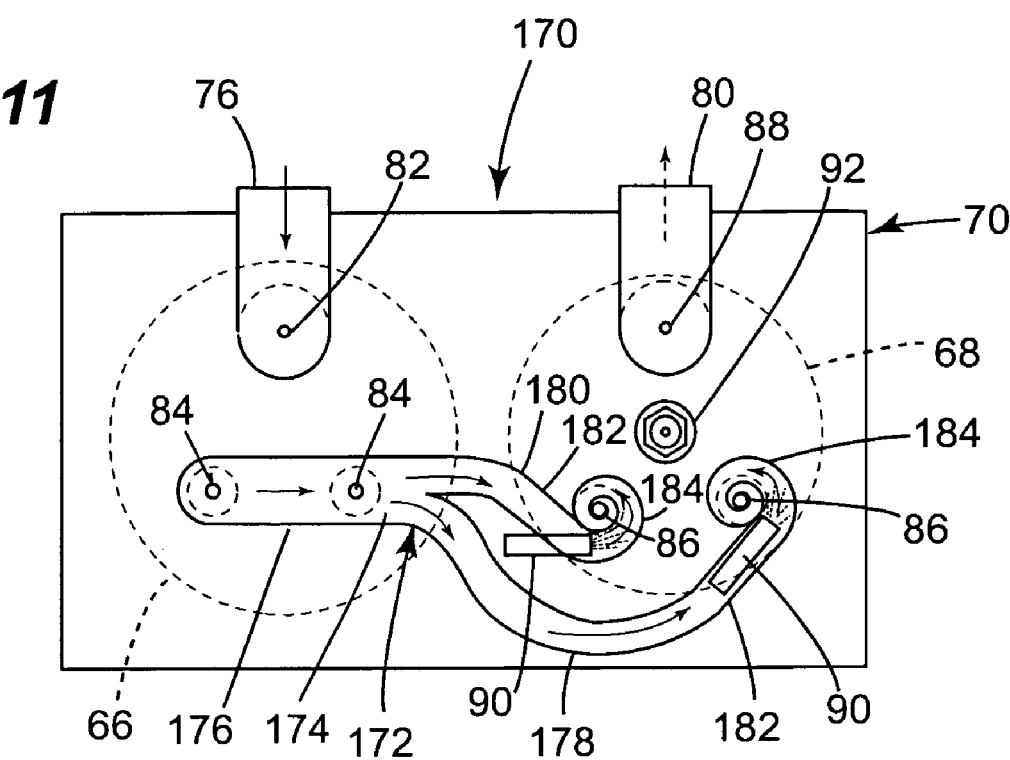
FIG. 11 is a top view similar to FIG. 5 but exemplifying one of various alternative crossover passage configurations.

FIG. 11 illustrates one example of such an alternative arrangement wherein like reference numerals are used to indicate components or features like or similar to those illustrated in FIGS. 4-6. FIG. 11 shows an engine 170 generally similar to engine 50 as shown in FIG. 4, and FIG. 5 in particular. The cylinder block, pistons and crank mechanism are not shown but may be identical to those of engine 50. The compression and expansion cylinders are shown by dashed lines 66, 68 in FIG. 11.

Engine 170 in FIG. 11 further includes a cylinder head 70 including an intake passage 76 and intake valve 82, an exhaust passage 80 and exhaust valve 88 and a spark plug 92 similar to those of engine 50. Dual crossover compression valves 84 and crossover expansion valves 86 are also included positioned like those of engine 50.

Engine 170 differs in that the dual crossover valves are connected by a modified crossover passage 172 defining a common pressure chamber 174 between the crossover valves 84, 86. The crossover passage 172 is formed with a single passage portion 176, which communicates serially with both crossover compression valves 84. Passage portion 176 then divides into at least a first branch 178 and a second branch 180, each connecting separately with one of the crossover expansion valves 86 through a tangential runner section 182. The runner sections 182 each connect with a helical end section 184, which may be identical with runner sections 100 and end sections 102 of engine 50. Fuel injectors 90 are positioned to inject fuel into the separate branches of the crossover passage 172 near the helical end sections 184 as in engine 50.

Various other alternative embodiments are also possible. As non-limiting examples, the crossover compression valves could be connected to separate branches of a Y or X shaped crossover passage with the branches connected by a central or end passage portion. A crossover manifold connecting together different numbers of crossover valves of a compression and expansion cylinder pair is also a possibility, for example, one or more crossover compression valves to one or more crossover expansion valves. Manifolds connecting more than one cylinder pair could also be considered. Also, if desired, fuel injectors could be mounted for injecting fuel directly into the expansion cylinders, instead of into the crossover passages of the split-cycle engine. Moreover direct fuel injection into a split-cycle compression ignition engine is within the scope of this invention.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A split-cycle engine comprising:

a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft; and at least one helical crossover passage interconnecting the compression and expansion cylinders, each of the at least one helical crossover passage including:

a crossover compression valve and a crossover expansion valve defining a pressure chamber therebetween, a generally straight runner section in a downstream portion of the helical crossover passage, and a helical end section integrally connected to the runner section and disposed over the crossover expansion valve, the crossover expansion valve including a valve stem and head, the helical end section enclosing a funnel spiraling about the valve stem, wherein the funnel forces incoming air to rotate about the valve stem prior to entering the expansion cylinder, wherein the runner section, of a first crossover passage of the at least one crossover passage, is a tangential runner section, which directs air flow into the funnel of the helical end section of the first crossover passage in a flow path that is within plus or minus 20 degrees of parallel relative to a tangential line extending through a point in the expansion cylinder's perimeter which is closest to the valve stem corresponding to the first crossover passage.

2. The split-cycle engine of claim 1 wherein the at least one helical crossover passage further comprises a pair of helical crossover passages, wherein the helical end sections of each pair of helical crossover passages spiral in the same direction.

3. The split-cycle engine of claim 2 wherein the pair of helical crossover passages further comprises a pair of tangential runner sections, which direct air flow into the funnel of each helical end section in a flow path that is within plus or minus 20 degrees of parallel relative to each tangential line extending through each point in the expansion cylinder's perimeter which is closest to each corresponding valve stem.

4. The split-cycle engine of claim 3 wherein each helical end section spirals in the clockwise direction.

5. The split-cycle engine of claim 3 wherein each helical end section spirals in the counterclockwise direction.

6. The split-cycle engine of claim 1 wherein the crossover expansion valve is an outwardly opening poppet valve.

7. The split-cycle engine of claim 1 further including a fuel injector disposed in the crossover passage.

8. A split-cycle engine comprising:

a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft; and at least one helical crossover passage interconnecting the compression and expansion cylinders, each of the at least one helical crossover passage including:

a crossover compression valve and a crossover expansion valve defining a pressure chamber therebetween, a generally straight runner section in a downstream portion of the helical crossover passage, a helical end section integrally connected to the runner section and disposed over the crossover expansion valve, the crossover expansion valve including a valve stem and head, the helical end section enclosing a funnel spiraling about the valve stem, wherein the funnel forces incoming air to rotate about the valve stem prior to entering the expansion cylinder, and at least a first branch and a second branch dividing from a single passage portion, wherein the first branch includes the runner section and the helical end section disposed over the crossover expansion valve, and the second branch includes a second runner section integrally connected to a second end section, the second end section being disposed over a second crossover expansion valve.

9. The split-cycle engine of claim 8 wherein the second end section of the second branch further comprises a second helical end section spiraling in the same direction as the helical end section of the first branch.

10. The split-cycle engine of claim 9 wherein the runner section of the first branch and the second runner section of the second branch comprise a pair of tangential runner sections.

11. A split-cycle engine comprising:

a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft; and a pair of tangential helical crossover passages interconnecting the compression and expansion cylinders, each tangential helical crossover passage including:

a crossover compression valve and a crossover expansion valve defining a pressure chamber therebetween, a helical end section disposed over each crossover expansion valve, each crossover expansion valve including a valve stem and head, each helical end section including a funnel spiraling about the valve stem of its crossover expansion valve, wherein the funnel forces incoming air to rotate about the valve stem prior to entering the expansion cylinder, and the helical end sections of the pair of helical crossover passages spiral in the same direction, and a tangential runner section integrally connected to each helical end section, which directs air flow into the funnel of the helical end section in a flow path that is within plus or minus 20 degrees of parallel relative to a tangential line extending through a point in the expansion cylinder's perimeter which is closest to the valve stem.

12. The split-cycle engine of claim 11 wherein each helical end section spirals in the clockwise direction.

13. The split-cycle engine of claim 11 wherein each helical end section spirals in the counterclockwise direction.

14. The split-cycle engine of claim 11 wherein each crossover expansion valve is an outwardly opening poppet valve.

15. The split-cycle engine of claim 11 further including a fuel injector disposed in each of the crossover passages.

* * * * *